(12) United States Patent
Morikawa

(10) Patent No.: US 8,164,808 B2
(45) Date of Patent: Apr. 24, 2012

(54) IMAGE READING DEVICE AND READING-CHARACTERISTIC CORRECTION METHOD FOR IMAGE READING DEVICE

(75) Inventor: Daisuke Morikawa, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 972 days.

(21) Appl. No.: 12/147,300

(22) Filed: Jun. 26, 2008

(65) Prior Publication Data

US 2009/0002784 A1 Jan. 1, 2009

(30) Foreign Application Priority Data

Jun. 29, 2007 (JP) ................... 2007-172744

(51) Int. Cl.
*H04N 1/04* (2006.01)
(52) U.S. Cl. ......... 358/518; 358/498; 358/408; 358/474
(58) Field of Classification Search .................. 358/518, 358/498, 408, 474, 486, 488, 505
See application file for complete search history.

(56) References Cited

U.S. PATENT DOCUMENTS 7,394,580 B2 * 7/2008 Ohsawa .................. 358/498
7,626,735 B2 * 12/2009 Mizuhashi et al. .......... 358/474

FOREIGN PATENT DOCUMENTS

| JP | 2001-157052 A | 6/2001 |
|---|---|---|
| JP | 2003-032504 A | 1/2003 |
| JP | 2003-219172 A | 7/2003 |
| JP | 2004-187144 A | 7/2004 |
| JP | 2005-123681 A | 5/2005 |
| JP | 2005-210268 A | 8/2005 |
| JP | 2006-229466 A | 8/2006 |

* cited by examiner

*Primary Examiner* — Houshang Safaipour
(74) *Attorney, Agent, or Firm* — Canon U.S.A., Inc. I.P. Division

(57) ABSTRACT

An image reading device for reading front and back sides of an original using different reading units has a simple configuration and is capable of matching the input-output characteristic of the front side and the input-output characteristic of the back side and reducing a difference between color on the front side and color on the back side. Based on image data of a color chart read by a front-side reading unit and image data of the color chart read by a back-side reading unit, the image reading device calculates and sets adjustment values for the front and back sides for individual hues of color patches of the color chart and performs adjustment for the front and back sides in accordance with adjustment values corresponding to hue of an original image when the original is read.

14 Claims, 14 Drawing Sheets

FIG. 6

| PATCH No. | DENSITY | REFLECTANCE | CCD READ BRIGHTNESS | | | CIS READ BRIGHTNESS | | |
|---|---|---|---|---|---|---|---|---|
| | | | RED | GREEN | BLUE | RED | GREEN | BLUE |
| 1 | 0.073 | 0.845 | 252.3 | 248.0 | 245.7 | 254.6 | 246.7 | 241.9 |
| 2 | 0.147 | 0.713 | 213.6 | 206.3 | 204.2 | 215.6 | 203.5 | 197.6 |
| 3 | 0.317 | 0.482 | 139.8 | 134.0 | 131.2 | 137.4 | 129.5 | 123.5 |
| 4 | 0.447 | 0.358 | 100.7 | 96.2 | 93.7 | 98.1 | 92.5 | 87.0 |
| 5 | 0.607 | 0.247 | 69.4 | 65.9 | 64.4 | 65.7 | 61.5 | 57.6 |
| 6 | 0.787 | 0.163 | 46.7 | 43.7 | 42.8 | 42.4 | 39.1 | 36.5 |
| 7 | 1.000 | 0.100 | 29.4 | 27.1 | 26.3 | 25.9 | 23.3 | 21.5 |
| 8 | 1.277 | 0.053 | 17.4 | 15.4 | 14.7 | 13.6 | 11.7 | 10.2 |
| 9 | 1.407 | 0.039 | 13.3 | 11.6 | 10.8 | 9.6 | 7.9 | 6.7 |
| 10 | 1.787 | 0.016 | 7.3 | 6.6 | 6.6 | 3.4 | 3.0 | 3.0 |

FIG. 9

| PATCH No. | DENSITY | REFLECTANCE | CCD READ BRIGHTNESS ||| CIS READ BRIGHTNESS AFTER CORRECTION |||
|---|---|---|---|---|---|---|---|---|
| | | | RED | GREEN | BLUE | RED | GREEN | BLUE |
| 1 | 0.073 | 0.845 | 252.3 | 248.0 | 245.7 | 252.1 | 248.2 | 250.7 |
| 2 | 0.147 | 0.713 | 213.6 | 206.3 | 204.2 | 214.1 | 205.3 | 205.4 |
| 3 | 0.317 | 0.482 | 139.8 | 134.0 | 131.2 | 137.8 | 132.1 | 129.8 |
| 4 | 0.447 | 0.358 | 100.7 | 96.2 | 93.7 | 99.6 | 95.5 | 92.7 |
| 5 | 0.607 | 0.247 | 69.4 | 65.9 | 64.4 | 68.0 | 64.8 | 62.6 |
| 6 | 0.787 | 0.163 | 46.7 | 43.7 | 42.8 | 45.2 | 42.6 | 41.2 |
| 7 | 1.000 | 0.100 | 29.4 | 27.1 | 26.3 | 29.1 | 27.0 | 25.9 |
| 8 | 1.277 | 0.053 | 17.4 | 15.4 | 14.7 | 17.2 | 15.5 | 14.3 |
| 9 | 1.407 | 0.039 | 13.3 | 11.6 | 10.8 | 13.3 | 11.7 | 10.7 |
| 10 | 1.787 | 0.016 | 7.3 | 6.6 | 6.6 | 7.2 | 6.9 | 7.0 |

FIG. 10

| PATCH No. | DIFFERENCE BEFORE CORRECTION ||| DIFFERENCE AFTER CORRECTION |||
|---|---|---|---|---|---|---|
| | RED | GREEN | BLUE | RED | GREEN | BLUE |
| 1 | 2.28 | 1.31 | 3.82 | 0.79 | 1.33 | 3.44 |
| 2 | 1.98 | 2.82 | 6.58 | 0.00 | 0.00 | 0.00 |
| 3 | 2.44 | 4.51 | 7.69 | 2.24 | 1.40 | 2.25 |
| 4 | 2.55 | 3.64 | 6.67 | 1.26 | 0.39 | 1.79 |
| 5 | 3.72 | 4.39 | 6.86 | 1.53 | 1.01 | 2.43 |
| 6 | 4.28 | 4.67 | 6.26 | 1.44 | 1.20 | 2.15 |
| 7 | 3.54 | 3.77 | 4.80 | 0.24 | 0.23 | 0.92 |
| 8 | 3.81 | 3.75 | 4.51 | 0.17 | 0.17 | 0.81 |
| 9 | 3.68 | 3.68 | 4.12 | 0.07 | 0.08 | 0.47 |
| 10 | 3.92 | 3.61 | 3.60 | 0.00 | 0.00 | 0.00 |
| AVERAGE DIFFERENCE | 3.22 | 3.61 | 5.49 | 0.78 | 0.58 | 1.43 |

IMAGE READING DEVICE AND READING-CHARACTERISTIC CORRECTION METHOD FOR IMAGE READING DEVICE

BACKGROUND OF THE INVENTION

1. Field of the Invention

The present invention relates to image reading devices for reading a first side and a second side of an original using different reading units and reading-characteristic correction methods for the image reading devices.

2. Description of the Related Art

An image reading device provided in a copying machine and configured to, in order to improve productivity, read the front and back sides of an original using a front-side reading unit and a back-side reading unit without inverting the original front-to-back is known (see, for example, Japanese Patent Laid-Open No. 2004-187144).

Such an image reading device reads the front and back sides of an original using different reading units. Thus, in a case where portions having the same image density are read using the front-side reading unit and the back-side reading unit, a difference in reading level may occur between the front-side reading unit and the back-side reading unit. In such a case, reproduced color and density may be different between the front side and the back side of the original.

Methods for performing image correction such that the density of image data read by a front-side reading unit and the density of image data read by a back-side reading unit are matched using a unit configured to correct a difference in reading level between the front-side reading unit and the back-side reading unit are available (see, for example, Japanese Patent Laid-Open No. 2005-210268 and Japanese Patent Laid Open No. 2001-157052).

In addition, a method for reading an adjustment original using a first reading unit and a second reading unit and determining gamma correction tables and color correction factors such that values of color components read by the first reading unit and values of the corresponding color components read by the second reading unit are matched is available (see, for example, Japanese Patent Laid-Open No. 2006-229466).

In the methods described in Japanese Patent Laid-Open Nos. 2005-210268 and 2001-157052, in the case of a monochrome image, the image densities of the front and back sides are matched. However, in the case of a color image, correction of a difference in image color between the front and back sides cannot be sufficiently performed in the methods. That is, even if the image densities of the front and back sides can be matched in the case of a monochrome image, colors of the front and back sides may not be the same in the case of a color image.

In the method described in Japanese Patent Laid-Open No. 2006-229466, the color of a portion read by the first reading unit and the color of a portion read by the second reading unit can be matched. However, since a memory for generating gamma correction tables is necessary, the circuit scale is increased and the cost is also increased.

SUMMARY OF THE INVENTION

According to an aspect of the present invention, an image reading device includes a first reading unit configured to read a first side of an original; a second reading unit configured to read a second side of the original; and a correction unit configured to correct a relative relationship between a tone characteristic of the first reading unit and a tone characteristic of the second reading unit based on a hue of an image read by the first reading unit or the second reading unit.

A reading-characteristic correction method according to another aspect of the present invention for an image reading device including a first reading unit and a second reading unit includes reading, by the first reading unit, a first side of an original; reading, by the second reading unit, a second side of the original; and correcting a relative relationship between a tone characteristic of the first reading unit and a tone characteristic of the second reading unit based on a hue of an image read by the first reading unit or the second reading unit.

Further features of the present invention will become apparent from the following description of exemplary embodiments with reference to the attached drawings.

BRIEF DESCRIPTION OF THE DRAWINGS

FIG. 6 is a table showing read brightnesses of front and back sides of the gray chart.

FIG. 9 is a table showing read brightnesses of the front and back sides of the gray chart after adjustment for the front and back sides using the gray chart is performed.

FIG. 10 is a table showing differences before adjustment for the front and back sides using the gray chart is performed and differences after adjustment for the front and back sides using the gray chart is performed.

DESCRIPTION OF THE EMBODIMENTS

An image reading device and a reading-characteristic correction method for the image reading device according to embodiments of the present invention will be described with reference to the drawings.

Figure 1:
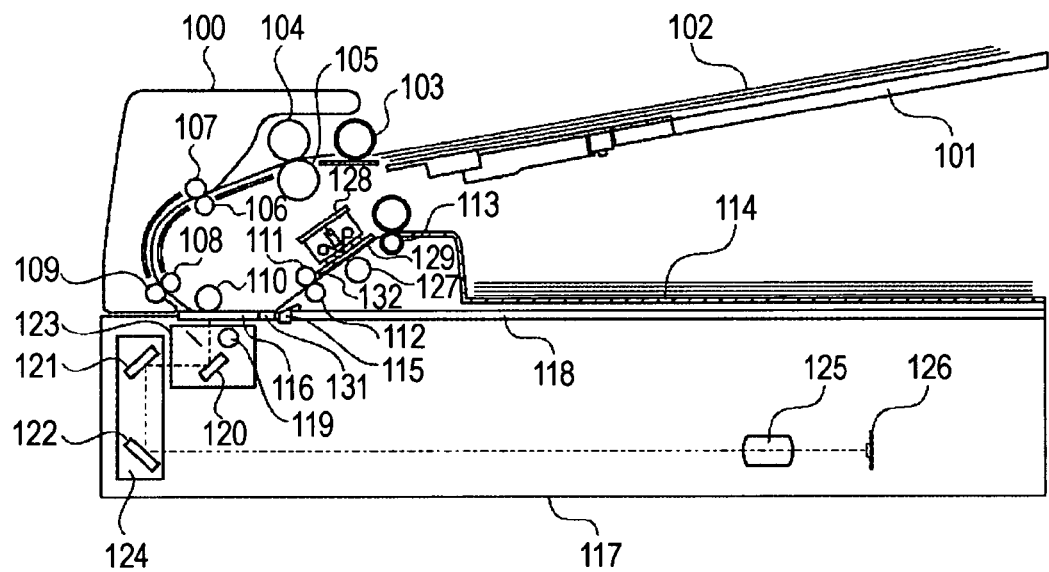
FIG. 1 is a sectional view of an image reading device according to an embodiment of the present invention.

FIG. 1 shows the configuration of an image reading device 117 according to an embodiment of the present invention. Reference numeral 100 denotes an original-feeding device. An original 102 is placed on an original tray 101. A feed roller 103 is provided above the original tray 101. The feed roller 103 feeds the original 102 that is placed on the original tray 101. Since the feed roller 103 is rotatably supported by an arm (not shown), swing motion of the arm allows the feed roller 103 to be moved upward and downward. Upon starting the feed operation, the feed roller 103 is lowered to be in contact with the front side of the original 102.

A roller 105 is located so as to face a separation roller 104 and is pushed toward the separation roller 104. The roller 105 is made of a rubber material or the like having a friction that is slightly lower than that of the separation roller 104. In cooperation with the separation roller 104, the roller 105 feeds, one by one, the original 102 fed by the feed roller 103.

The original 102 separated by the separation roller 104 impinges against nip portions of stationary registration rollers 106 and 107, and the position of a leading edge of the original is adjusted. A lead roller 108 and a driven roller 109 convey the original 102 toward a flow-reading glass 116. A platen roller 110 is located so as to face the flow-reading glass 116.

A charge-coupled device (CCD) line sensor (hereinafter, simply referred to as a CCD) 126 reads an image on a front side (a first side) of the original 102 conveyed on the flow-reading glass 116. After the image on the front side of the original 102 is read by the CCD 126, the original 102 is conveyed by a lead roller 111 and a driven roller 112 toward a contact image sensor (CIS) 128. A jump platform 115 picks up a sheet on the flow-reading glass 116. A platen roller 127 is located so as to face the CIS 128.

The CIS 128 reads image information on a back side (a second side) of the original 102 conveyed on a flow-reading glass 129. After the image on the back side of the original 102 is read by the CIS 128, the original 102 is output to an output tray 114 by an output roller 113.

The image reading device 117 includes a lamp 119 that applies light to a side of the original 102 to be read and mirrors 120, 121, and 122 for guiding light reflected from the original 102 to the CCD 126. The lamp 119 and the mirror 120 are provided on a first mirror carriage 123. The mirrors 121 and 122 are provided on a second mirror carriage 124.

The mirror carriages 123 and 124 are coupled to a driving motor (not shown) through wires (not shown). In accordance with rotation of the driving motor, each of the mirror carriages 123 and 124 moves in parallel to an original plate glass 118. Light reflected from the original 102 is guided through the mirrors 120, 121, and 122 to a lens 125, and an image is formed, by the lens 125, on a photo detector of the CCD 126. The CCD 126 performs photoelectric conversion of the reflected light and outputs an electric signal (analog signal) corresponding to an incident light quantity.

A photo detector of the CIS 128 performs photoelectric conversion of the light reflected from the original 102, and outputs an electric signal (analog signal) corresponding to an incident light quantity.

The image reading device having the above-described configuration has an original fixed-reading mode and an original flow-reading mode. In the original fixed-reading mode, when the first mirror carriage 123 and the second mirror carriage 124 are moved in a sub-scanning direction, the original 102 placed on the original plate glass 118 is read. In the original flow-reading mode, when the original-feeding device 100 feeds the original 102 in a state where the first mirror carriage 123 and the second mirror carriage 124 remain stationary, the original 102 placed on the flow-reading glass 116 is read. In the original flow-reading mode, an image on the back side of the original 102 is also read by the CIS 128 through the flow-reading glass 129.

Figure 2:
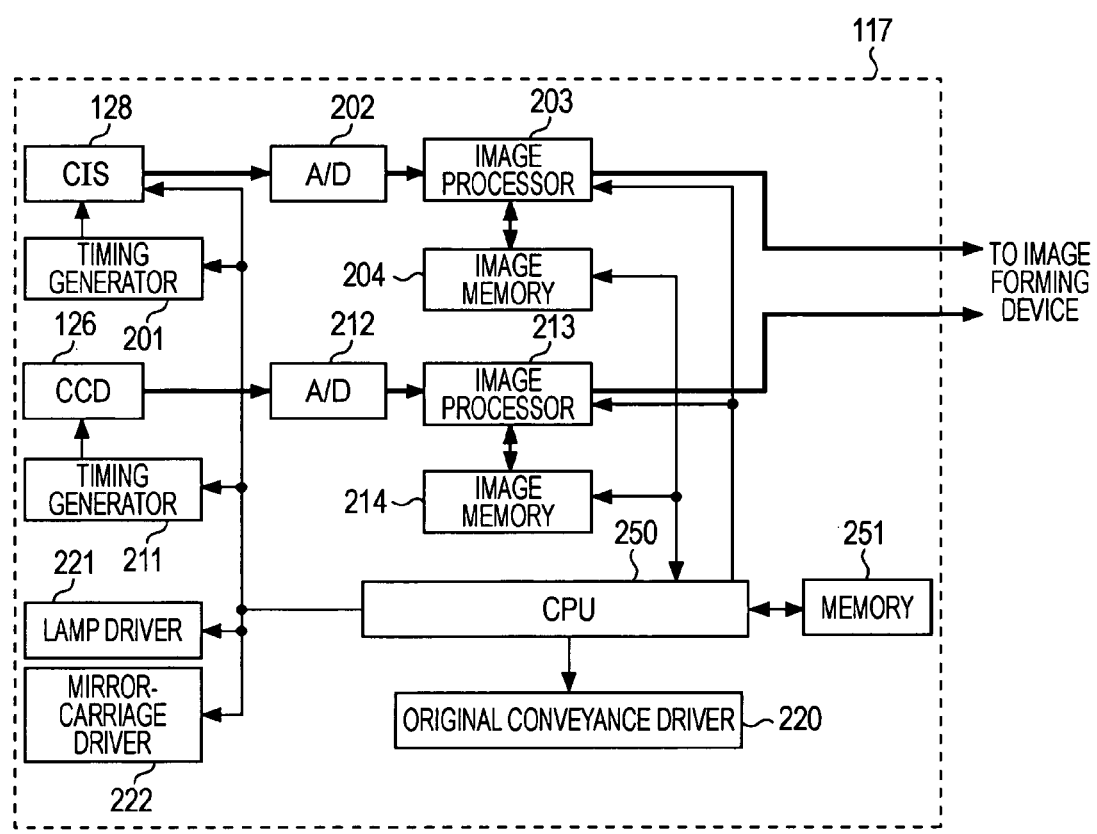
FIG. 2 is a block diagram showing the image reading device according to the embodiment.

FIG. 2 is a block diagram showing an image reading device according to this embodiment. Timing generators 211 and 201 supply reading timing signals to the CCD 126 and the CIS 128, respectively. An analog signal output from the CCD 126 is converted into a digital signal by an analog-to-digital (A/D) converter 212. A digital signal (image data) output from the A/D converter 212 is subjected to image processing, such as shading correction, by an image processor 213. Image data to be subjected to image processing by the image processor 213 and image data that has been subjected to image processing by the image processor 213 are temporarily stored in an image memory 214. Image data that has been subjected to image processing by the image processor 213 is transmitted to an image forming device (not shown). An analog signal output from the CIS 128 is converted into a digital signal by an analog-to-digital (A/D) converter 202. A digital signal (image data) output from the A/D converter 202 is subjected to image processing, such as shading correction, by an image processor 203. Image data to be subjected to image processing by the image processor 203 and image data that has been subjected to image processing by the image processor 203 are temporarily stored in an image memory 204. The image data that has been subjected to image processing by the image processor 203 is transmitted to the image forming device. The image forming device forms, in accordance with an electrophotography method or an inkjet method, on a sheet an image based on image data received from the image reading device 117.

Figure 3:
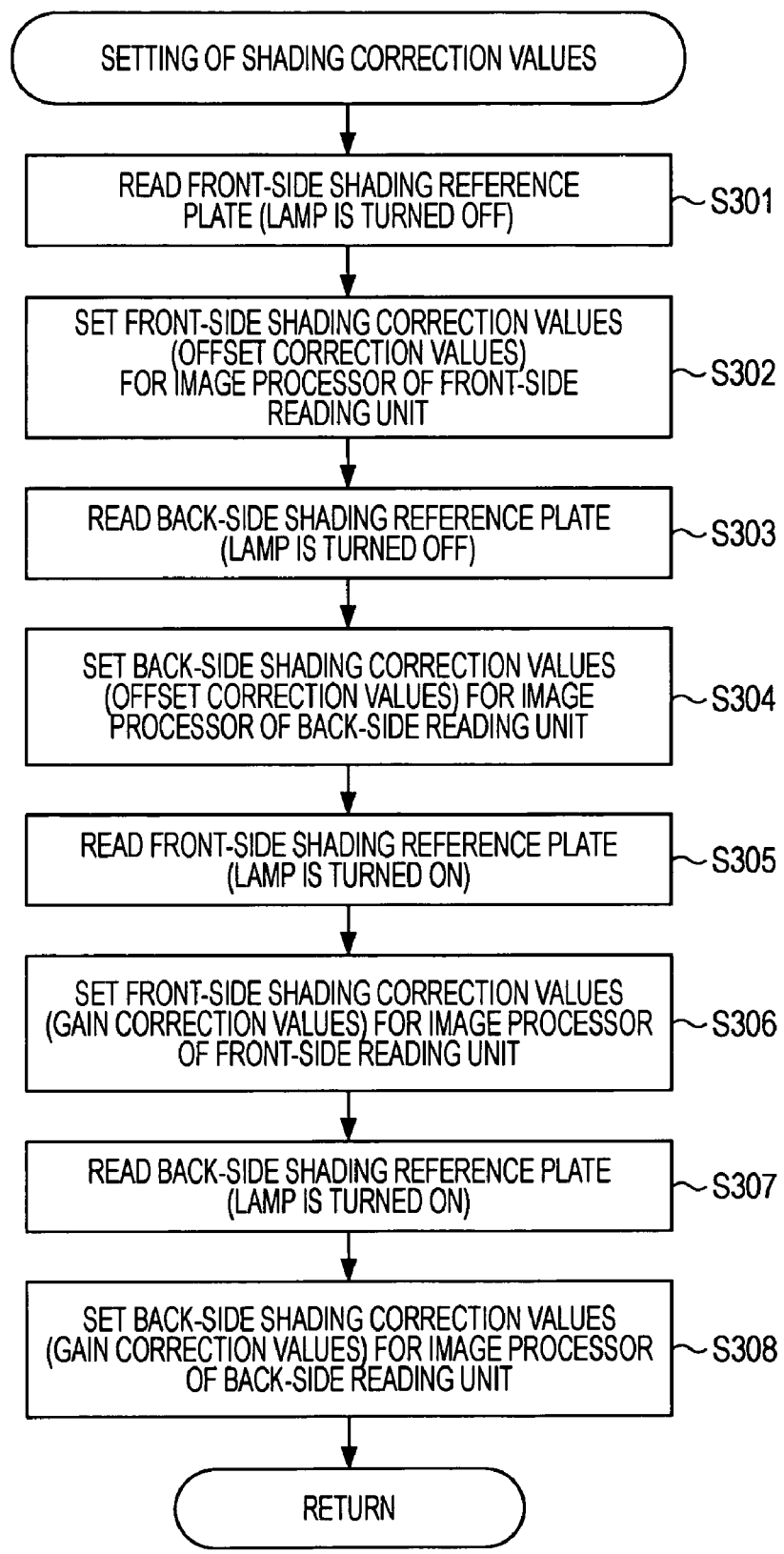
FIG. 3 is a flowchart showing a process for setting shading correction values.

A process for setting shading correction values for the CCD 126 and the CIS 128 will be described with reference to a flowchart shown in FIG. 3. Shading correction is processing for correcting reading variations in a main-scanning direction of the CCD 126 and the CIS 128. The CPU 250 performs setting of the shading correction values before causing the original-feeding device 100 to feed a first original to the flow-reading glass 116 or after reading a predetermined number of originals, e.g. one hundred originals, in succession.

The CPU 250 controls a mirror-carriage driver 222 to move the first mirror carriage 123 to the position of a shading reference plate 131. In a state where the lamp 119 is turned off, the CCD 126 reads the shading reference plate 131 (step S301). An image signal from the CCD 126 is temporarily stored as image data in the image memory 214 through the A/D converter 212 and the image processor 213. The CPU 250 determines offset correction values for shading correction for the CCD 126 on the basis of the data read at this time, and sets the offset correction values in the image processor 213 (step S302). The offset correction values are values for individual pixels of the CCD 126, each of the values being obtained such that image data after the shading correction at the time when the lamp is turned off is performed is equal to a first predetermined value (for example, a brightness of 5).

Then, the CPU 250 turns off a lamp contained in the CIS 128. Then, the CIS 128 reads the shading reference plate 132 (step S303). An image signal from the CIS 128 is temporarily stored as image data in the image memory 204 through the A/D converter 202 and the image processor 203. Similarly to the shading correction data for the CCD 126, the CPU 250 determines offset correction values for shading correction for the CIS 128 on the basis of the data read at this time, and sets the offset correction values in the image processor 203 (step S304).

Then, the CPU 250 controls a lamp driver 221 to turn on the lamp 119, and the CCD 126 reads light reflected from the shading reference plate 131 (step S305). An image signal from the CCD 126 is temporarily stored as image data in the image memory 214 through the A/D converter 212 and the image processor 213. The CPU 250 determines gain correction values for shading correction for the CCD 126 on the basis of the read data based on the shading reference plate 131, and sets the gain correction values in the image processor 213 (step S306). The gain correction values are values for individual pixels of the CCD 126, each of the values being obtained such that image data after the shading correction at the time when the CCD 126 reads the shading reference plate 131 is performed is equal to a second predetermined value (for example, a brightness of 245).

Then, the CPU 250 turns on the light source contained in the CIS 128 and moves the flow-reading glass 129 in a direction in which the original 102 is conveyed, so that the shading reference plate 132 provided on the flow-reading glass 129 is moved to a reading position of the CIS 128. The CIS 128 reads light reflected from the shading reference plate 132 (step S307). An image signal from the CIS 128 is temporarily stored as image data in the image memory 204 through the A/D converter 202 and the image processor 203. Similarly to the shading correction data for the CCD 126, the CPU 250 determines gain correction values for shading correction for the CIS 128 on the basis of the read data based on the shading reference plate 132, and sets the gain correction values in the image processor 203 (step S308).

Then, the image processors 213 and 203 perform, for image data of original images output from the CCD 126 and the CIS 128, shading correction involving gain adjustment and offset adjustment set for individual pixels by the CPU 250.

As described above, shading correction is performed for image data output from the CCD 126 configured to read a front-side image of an original and for image data output from the CIS 128 configured to read a back-side image of the original.

Figure 4:
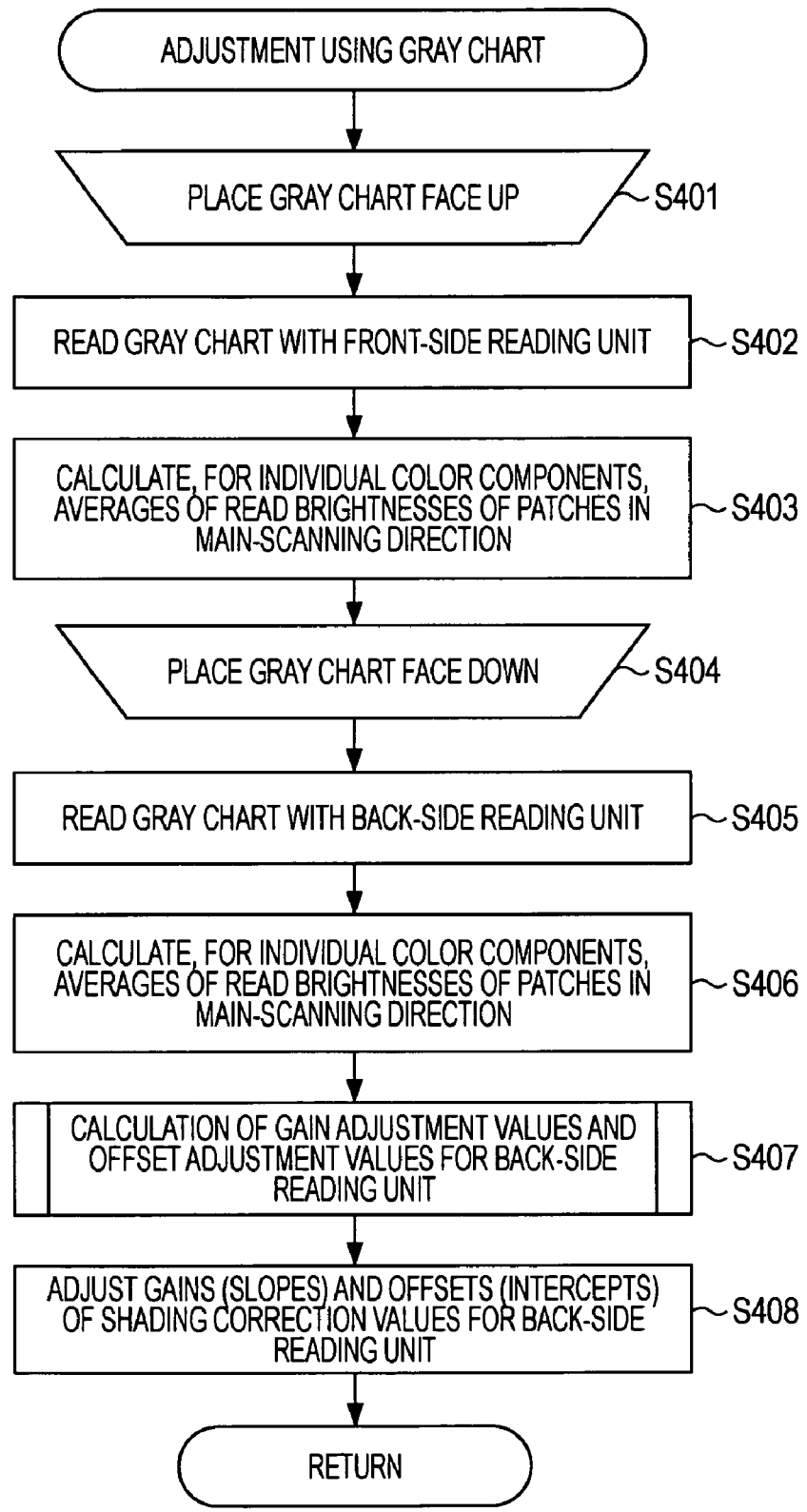
FIG. 4 is a flowchart showing a process for adjusting the front and back sides using a gray chart.
Figure 5:
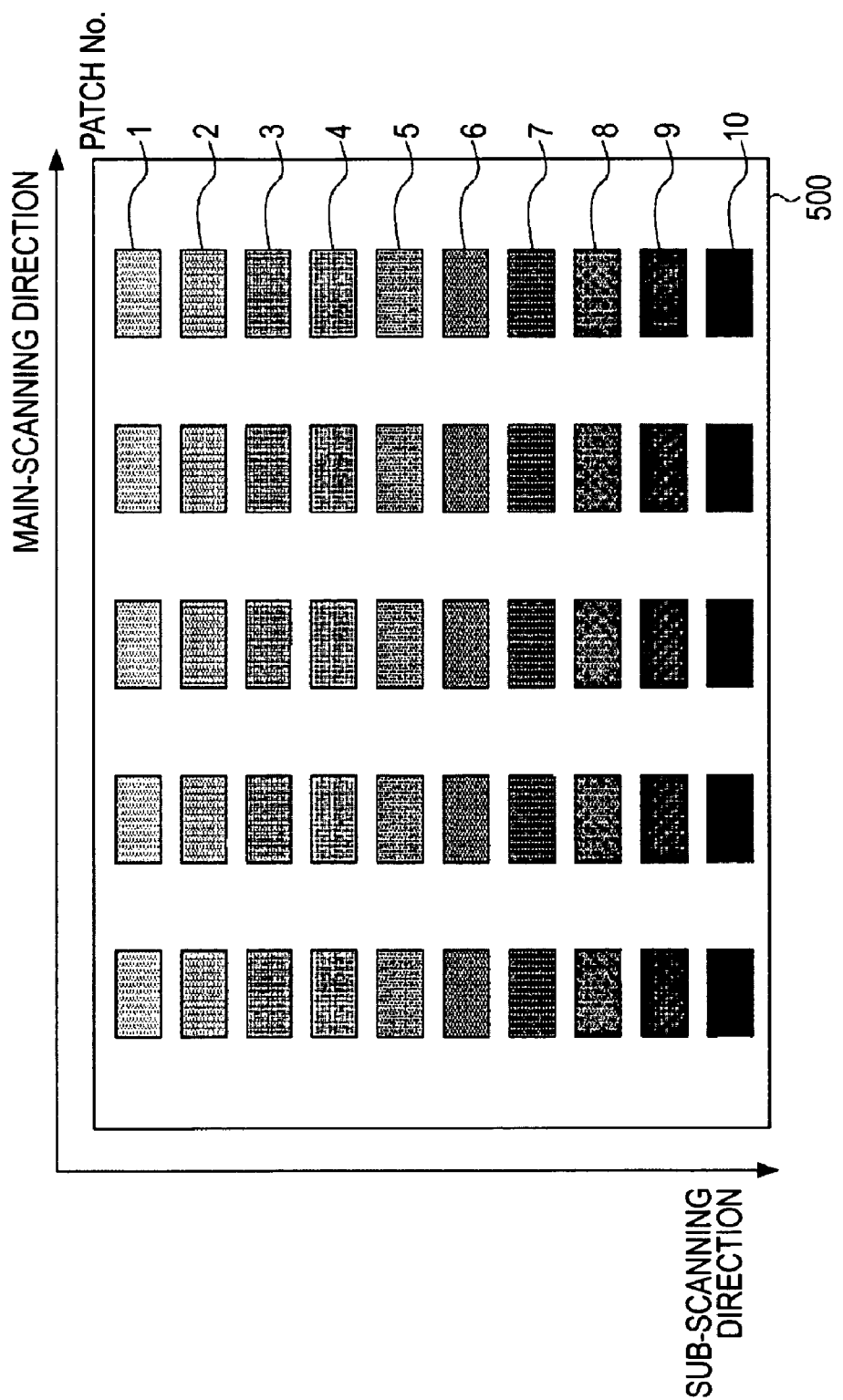
FIG. 5 shows an example of the gray chart.

Adjustment for the front and back sides using a gray chart will now be described with reference to a flowchart shown in FIG. 4. An adjustment operator places a gray chart 500 face up on the original tray 101 such that the gray chart 500 is fed in a sub-scanning direction shown in FIG. 5 (step S401). The gray chart 500 includes a plurality of grayscale patches having at least two different reflectances, as shown in FIG. 5. Densities of the patches constituting the gray chart 500 are constant in a main-scanning direction. Although the gray chart 500 includes a plurality of grayscale patches in this example, the gray chart 500 does not necessarily include grayscale patches. The gray chart 500 may include any type of images, such as band-shaped images, as long as the images are grayscale images having a plurality of grayscale levels.

The CPU 250 controls an original conveyance driver 220 of the original-feeding device 100 to feed the gray chart 500. The CCD 126 (the front-side reading unit, that is, a first reading unit) reads the gray chart 500 (step S402). The read image data of the gray chart 500 is stored in the image memory 214 through the image processor 213. The CPU 250 reads read brightnesses of the grayscale patches (the averages of the read brightnesses of the grayscale patches (for example, 100 pixels×100 pixels)) of the gray chart 500 stored in the image memory 214, and stores the read brightnesses in a memory 251.

On the basis of the read brightnesses of the grayscale patches stored in the memory 251, the CPU 250 calculates, for individual color components (red, green, and blue), the averages of the read brightnesses of the grayscale patches in the main-scanning direction (step S403). FIG. 6 is a table showing a specific example of the read brightnesses of grayscale patches, the read brightnesses being obtained for individual densities by reading the correction chart. In FIG. 6, the read brightnesses of grayscale patches only in a central portion of the gray chart 500 shown in FIG. 5 are shown as typical values. In FIG. 6, densities represent measured densities of the grayscale patches, and reflectances represent values defined by equation (1).

$$R = \frac{1}{10^D} \quad (1)$$

In equation (1), "R" represents reflectance and "D" represents density.

Then, the adjustment operator places the gray chart 500 face down on the original tray 101 such that the gray chart 500 is fed in the sub-scanning direction shown in FIG. 5 (step S404).

The CPU 250 controls the original conveyance driver 220 of the original-feeding device 100 to feed the gray chart 500. The CIS 128 (the back-side reading unit, that is, a second reading unit) reads the gray chart 500 (step S405). The read image data of the gray chart 500 is stored in the image memory 204 through the image processor 203. The CPU 250 reads read brightnesses of the grayscale patches of the gray chart 500 stored in the image memory 204, and stores the read brightnesses in the memory 251.

On the basis of the read brightnesses of the grayscale patches stored in the memory 251, the CPU 250 calculates, for individual color components (red, green, and blue), the averages of the read brightnesses of the grayscale patches in the main-scanning direction and stores the obtained averages in the memory 251 (step S406).

Figure 7:
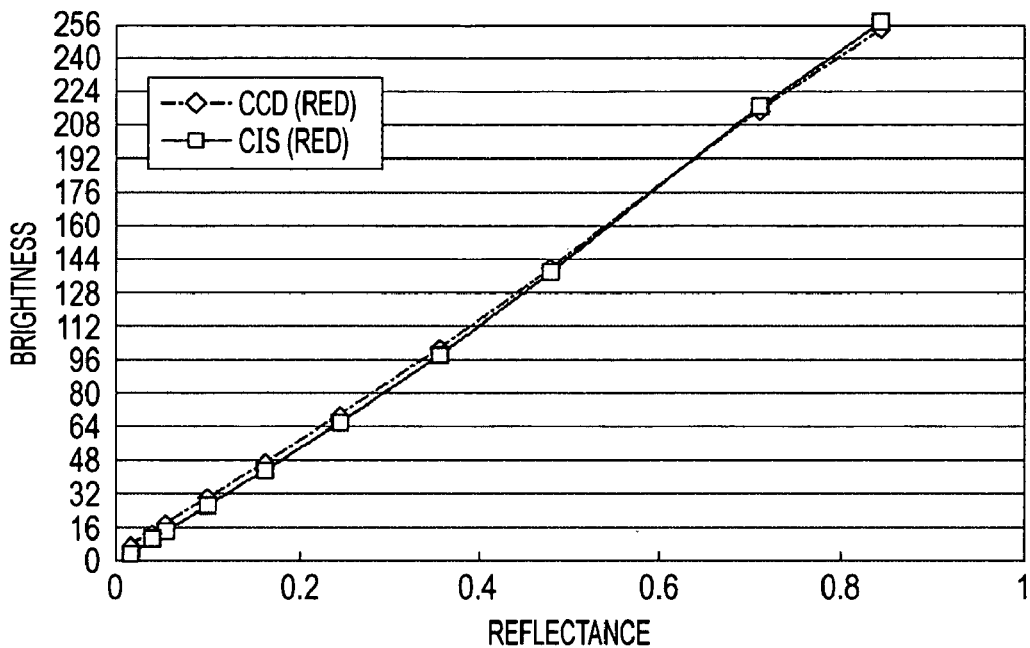
FIG. 7 is a graph showing the linearity characteristic of a front-side reading unit and the linearity characteristic of a back-side reading unit.

FIG. 7 shows the linearity characteristic of red components of the CCD 126 and the linearity characteristic of red components of the CIS 128. The abscissa represents reflectance of the gray chart and the ordinate represents read brightness. Although only the linearity characteristic of the red components is shown in FIG. 7, similar tendency can be obtained for green and blue components. As stated above, there are differences between the linearity characteristic of the front-side reading unit and the linearity characteristic of the back-side reading unit. Thus, processing for reducing the differences in linearity characteristic between the front side and the back side is performed.

Then, the CPU 250 calculates gain adjustment values and offset adjustment values for the CIS 128 (the back-side reading unit, that is, the second reading unit) (step S407). The CPU 250 sets the gain adjustment values (slope adjustment values) and the offset adjustment values (intercept adjustment values) for the shading correction values for the CIS 128 in the image processor 203 (step S408).

Calculation of the gain adjustment values and the offset adjustment values for the CIS 128 (the back-side reading unit) to be performed in step S407 will be described with reference to a flowchart shown in FIG. 8. As described above, the shading correction values for the front-side reading unit and the back-side reading unit are individually set. In this state, the reading characteristic of the front-side reading unit and the reading characteristic of the back-side reading unit are independent of each other. Thus, the linearity characteristic (that is, characteristic of original reflectance and read brightness or tone characteristic) of the back-side reading unit is adjusted such that the linearity characteristic of the CCD 126 (the front-side reading unit) and the linearity characteristic of the CIS 128 (the back-side reading unit) are matched. Accordingly, the relative relationship between the tone characteristic when the front-side reading unit reads the gray chart and the tone characteristic when the back-side reading unit reads the gray chart can be corrected.

In this embodiment, adjustment for front-side read brightnesses and back-side read brightnesses is performed using a patch having a low density and a patch having a high density among a plurality of halftone grayscale patches. The two grayscale patches each have a reflectance that can be expressed by linear approximation of characteristic of original reflectance and read brightness. Here, linearity correction for the back-side reading unit is performed on the basis of read brightnesses of the front-side reading unit and read brightness of the back-side reading unit, for example, for a grayscale patch No. 2 (having a density of 0.147 and a reflectance of 0.713) and a grayscale patch No. 10 (having a density of 1.787 and a reflectance of 0.016).

First, regarding the front-side reading unit, the CPU 250 reads, for individual color components, the averages of the two grayscale patches (the patch No. 2 and the patch No. 10) stored in the memory 251. Then, on the basis of the read values, the CPU 250 calculates, for individual color components, slopes and intercepts of the characteristic of original reflectance and read brightness of the CCD 126 (the front-side reading unit) (step S801). The characteristic of original reflectance and read brightness (linearity characteristic) of the CCD 126 is used as a reference for matching the linearity characteristic of the front-side reading unit and the linearity characteristic of the back-side reading unit. Then, similarly to the CCD 126, the CPU 250 calculates, for individual color components, slopes and intercepts of the characteristic of original reflectance and read brightness of the CIS 128 on the basis of the averages of the two grayscale patches (the patch No. 2 and the patch No. 10) for individual color components (step S801).

Then, the CPU 250 calculates, for individual color components, adjustment values (gain adjustment values and offset adjustment values) for shading correction values for the back-side reading unit such that the linearity characteristic of the back-side reading unit for individual color components matches the linearity characteristic of the front-side reading unit for individual color components (step S802). After the CPU 250 calculates the gain adjustment values and the offset adjustment values, the process returns to step S407 of FIG. 4.

Here, the following table is obtained.

|  | Read brightness of high-density patch | Read brightness of low-density patch |
| --- | --- | --- |
| CCD | X1 | X2 |
| CIS | Y1 | Y2 |

Then, a gain adjustment value a and an offset adjustment value b can be obtained by the following equations (2) and (3):

$$a = \frac{x_2 - x_1}{y_2 - y_1} \quad (2)$$

$$b = x_2 - ay_2 \quad (3)$$

In accordance with the values obtained by calculations using equations (2) and (3), shading correction data is adjusted. More specifically, for individual pixels, gain correction values for shading correction data are multiplied by gain adjustment values and offset adjustment values are added to offset correction values for the shading correction data. The results obtained by the calculations are shown in FIG. 9.

FIG. 10 shows differences between the read brightnesses of the CCD 126 and the read brightnesses of the CIS 128 before adjustment and differences between the read brightnesses of the CCD 126 and the read brightnesses of the CIS 128 after adjustment. By performing adjustment of shading correction data for the front and back sides, differences in read values are reduced. Although a difference of at most about eight is measured before adjustment, a difference of at most about three is measured after adjustment. Accordingly, adjustment of read brightnesses for the front and back sides can be achieved in a wide range from a high-density portion to a low-density portion.

However, since adjustment for front and back sides using a gray chart is performed while focusing only on grayscale patches of gray (halftone), a difference between the read brightness of color (chromatic color) on the front side and the read brightness of color on the back side may not be reduced.

Figure 11:
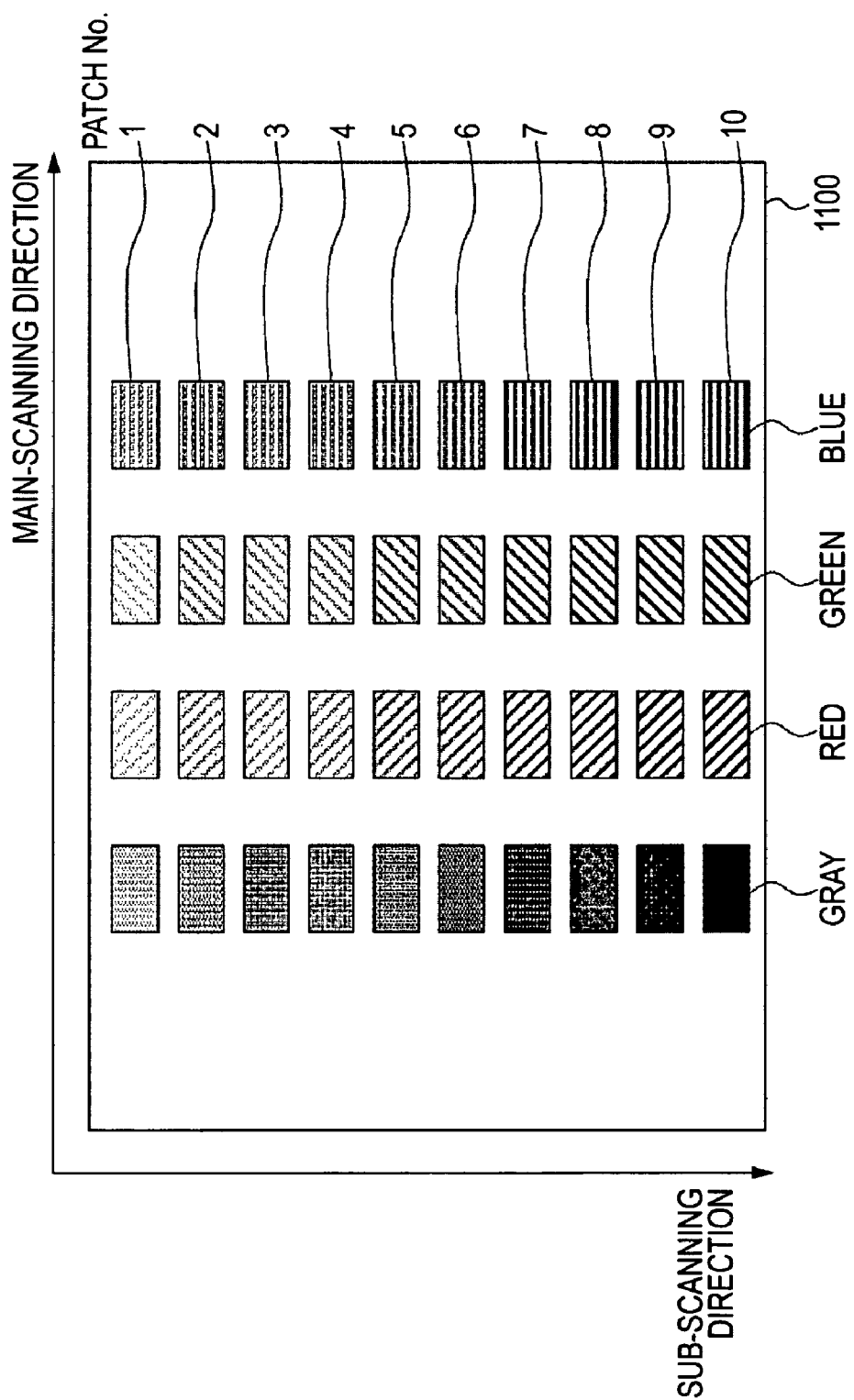
FIG. 11 shows an example of a color chart.

In order to verify that a difference between the read brightness of color on the front side and the read brightness of color on the back side may not be reduced when adjustment for the front and back sides is performed using the gray chart, read brightnesses of the front side and read brightnesses of the back side are compared with each other by reading a color chart (color reference original) 1100, such as the one shown in FIG. 11, that includes color patches of reference colors, that is, red, green, and blue, as well as gray, using the front-side reading unit and the back-side reading unit read.

Figure 12:
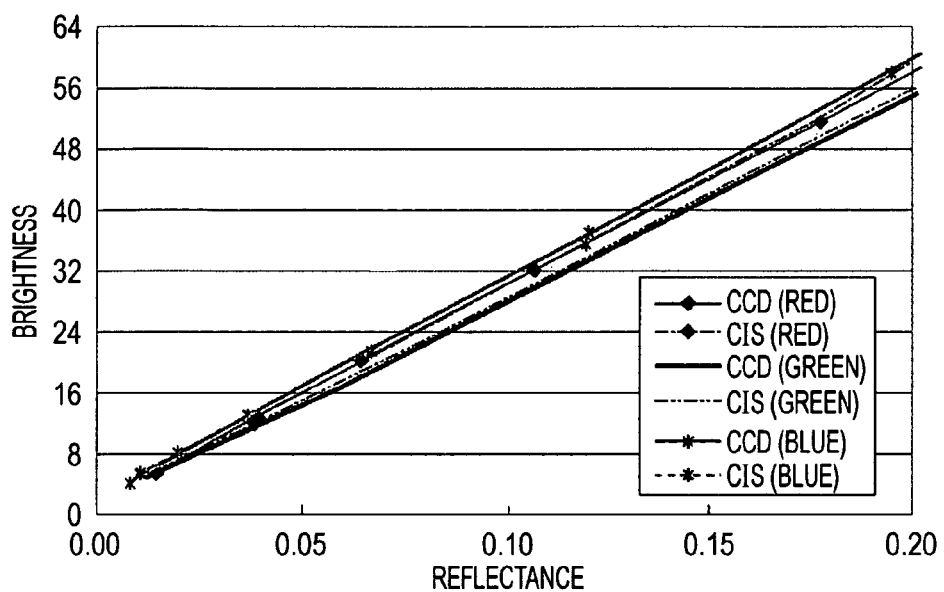
FIG. 12 is a graph showing the linearity characteristic of the front-side reading unit and the linearity characteristic of the back-side reading unit after adjustment for the front and back sides using the gray chart is performed.

FIG. 12 shows the linearity characteristic for individual color components in a case where the gray patches shown in FIG. 11 are read after adjustment for reducing differences between read brightnesses of the front side and read brightnesses of the back side is performed while grayscale level of gray is focused on, as described above. As is clear from FIG. 12, differences between the linearity characteristic of the front side and the linearity characteristic of the back side for individual color components are reduced.

Figure 13:
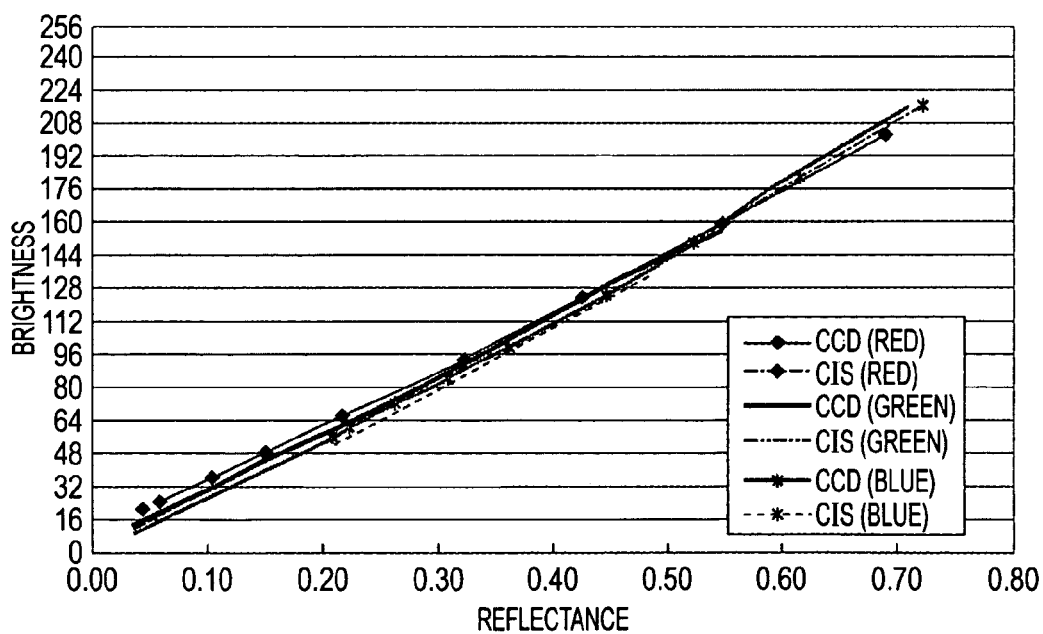
FIG. 13 is a graph showing read brightnesses of the front and back sides of a color chart after adjustment for the front and back sides using the gray chart is performed.
Figure 14:
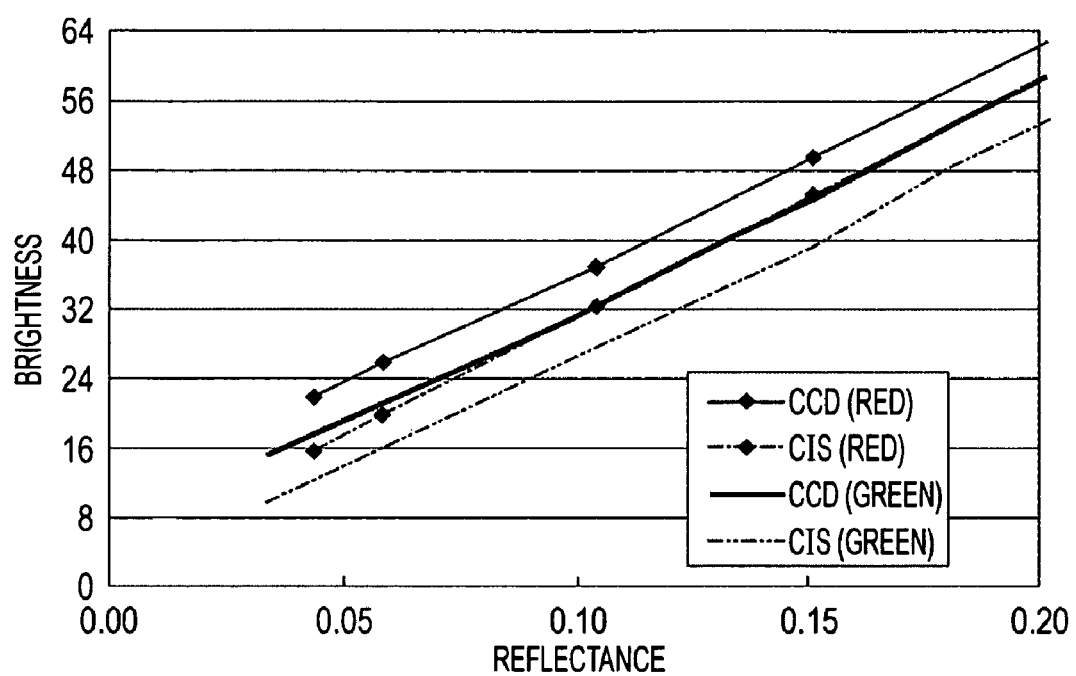
FIG. 14 is a table showing read brightnesses of the front and back sides of the color chart after adjustment for the front and back sides using the gray chart is performed.

However, in the state in which adjustment has been performed as described above, for example, when the blue patches in the color chart 1100 shown in FIG. 11 are read, a great difference may occur between the linearity of the front side and the linearity of the back side. FIG. 13 shows the linearity characteristic for individual color components in a case where the blue patches are read. In FIG. 13, the reflectance and read brightness of a blue patch having the lowest density correspond to the lowest values for individual color components. However, as is clear from FIG. 13, the read brightness and reflectance of a color component of the front side are not the same as the read brightness and reflectance of the color component of the back side. FIG. 14 is a graph in which a low-reflectance portion of the linearity characteristic shown in FIG. 13 is enlarged. As shown in FIG. 14, differences between the front and back sides are about five to six, and such differences appear as differences between the hues on the front side and the hues on the back side. That is, even if adjustment for the front and back sides is performed using a gray chart, in the case of chromatic colors, which are not gray, a difference between the read brightness of the front side and the read brightness of the back side may occur.

Thus, in this embodiment, adjustment values for differences between the front and back sides in a case where the gray, red, green, and blue patches in the color chart 1100 are read are generated in advance, and processing for selectively using an adjustment value appropriate for each pixel in accordance with the hue of the pixel when an original is read is performed. That is, correction values for differences between the front and back sides in a case where hues of the color reference original are read are generated in advance, and correction for the front and back sides is performed by selectively using a correction value appropriate for each pixel in accordance with the hue of the pixel when the original is read. Thus, differences between color on the front side and color on the back side can be reduced in an optimal manner, irrespective of whether an original image is a gray image or a color image and irrespective of which color component has a larger value.

Figure 15:
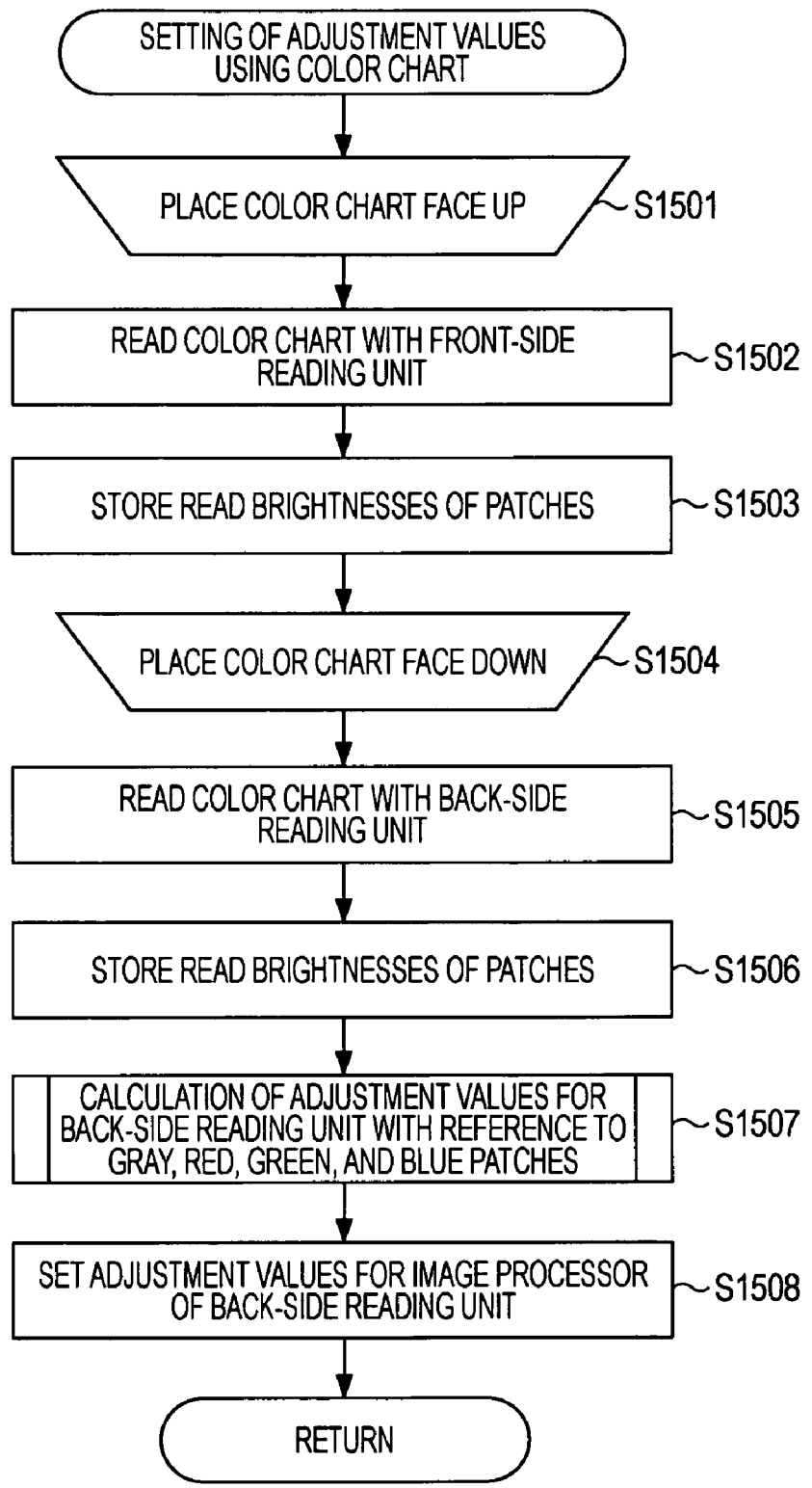
FIG. 15 is a flowchart showing a process for adjusting the front and back sides using the color chart.

Adjustment for the front and back sides using the color chart 1100 will be described with reference to a flowchart shown in FIG. 15. An adjustment operator places the color chart (reference original) 1100 shown in FIG. 11 face up on the original tray 101 such that the color chart 1100 is fed in the sub-scanning direction shown in FIG. 11 (step S1501). The color chart 1100 includes gray patches and color patches of red, green, and blue having different reflectances from a high reflectance to a low reflectance. Although the color chart 1100 includes patches in this example, the color chart 1100 does not necessarily include patches. The color chart 1100 may include any type of reference images, such as band-shaped images.

The CPU 250 controls the original conveyance driver 220 of the original-feeding device 100 to feed the color chart 1100. The CCD 126 (the front-side reading unit, that is, a first reading unit) reads the color chart 1100 (step S1502). The read image data of the color chart 1100 is stored in the image memory 214 through the image processor 213. The CPU 250 reads read brightnesses of the patches of the color chart 1100 stored in the image memory 214, and stores the read brightnesses in the memory 251 (step S1503).

Then, the adjustment operator places the color chart 1100 face down on the original tray 101 such that the color chart 1100 is fed in the sub-scanning direction in FIG. 11 (step S1504).

The CPU 250 controls the original conveyance driver 220 of the original-feeding device 100 to feed the color chart 1100. The CIS 128 (the back-side reading unit, that is, the second reading unit) reads the color chart 1100 (step S1505). The read image data of the color chart 1100 is stored in the image memory 204 through the image processor 203. The CPU 250 reads read brightnesses of the patches of the color chart 1100 stored in the image memory 204, and stores the read brightnesses in the memory 251 (step S1506).

On the basis of the read brightnesses of the patches stored in the memory 251, the CPU 250 calculates, with reference to the patches of gray, red, green, and blue, gain adjustment values and offset adjustment values for the CIS 128 (the back-side reading unit, that is, the second reading unit) (step S1507). Then, the CPU 250 sets, as adjustment values for the shading correction values for the CIS 128, the gain adjustment values and the offset adjustment values for gray, red, green, and blue in the image processor 203 (step S1508).

Figure 8:
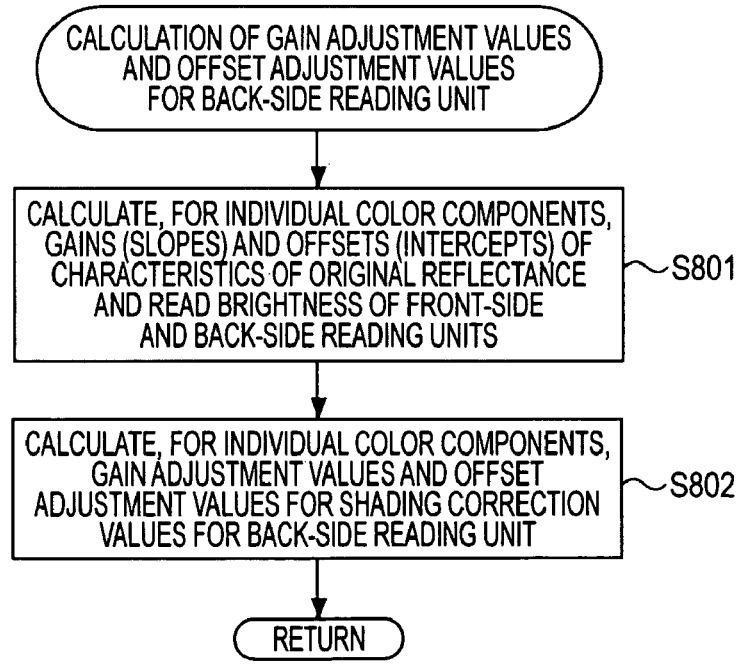
FIG. 8 is a flowchart showing a process for calculating gain adjustment values and offset adjustment values for the back-side reading unit.

The adjustment values for the back-side reading unit are calculated in accordance with the flowchart shown in FIG. 8. That is, for the patches of gray, red, green, and blue, the characteristic of original reflectance and read brightness (linearity characteristic) of the front-side reading unit and the characteristic of original reflectance and read brightness (linearity characteristic) of the back-side reading unit are calculated on the basis of the low-density patch (the patch No. 1) and the high-density patch (the patch No. 10). Then, adjustment values (gain adjustment values and offset adjustment values) for shading correction values for the back-side reading unit are calculated for individual color components such that the linearity characteristic of the back-side reading unit for individual color components matches the linearity characteristic of the front-side reading unit for individual color components. Then, the CPU 250 sets the gain adjustment values and the offset adjustment values for gray, red, green, and blue in the image processor 203. The above-described processing may be performed by, instead of the CPU 250, by a computer installed in a factory through the CPU 250.

Figure 16:
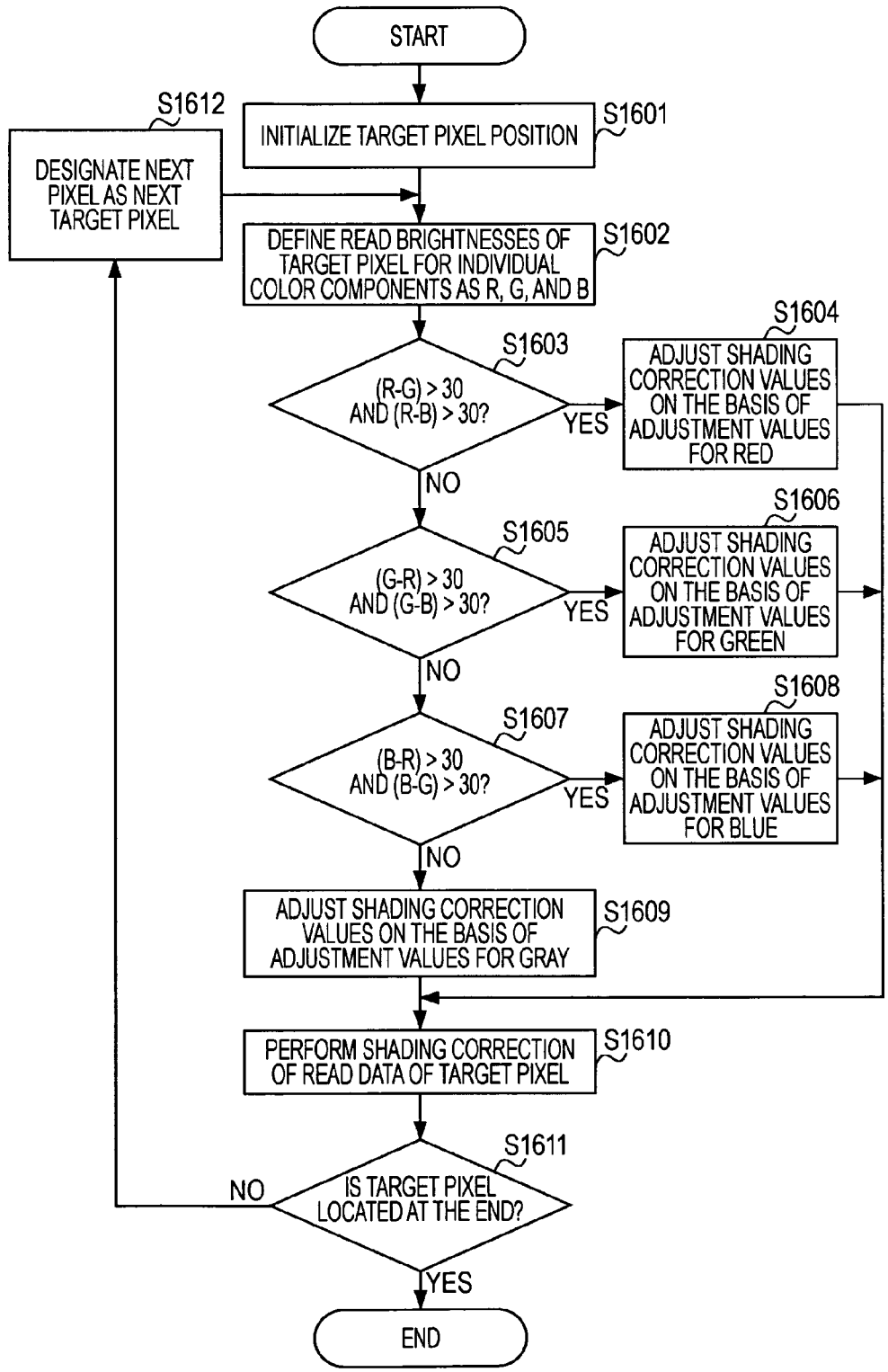
FIG. 16 is a flowchart showing a shading correction process to be performed by the image processor 203.

Shading correction processing to be performed by the image processor 203 when an original is read by the image reading device 117 will now be described with reference to FIG. 16. As stated above, an image on the front side of the original is read by the CCD 126 and an image on the back side of the original is read by the CIS 128. An image signal from the CIS 128 is input to the image processor 203 through the A/D converter 202. The image processor 203 performs initialization such that a pixel located at the beginning is designated as a target pixel (step S1601), and defines read brightnesses of the target pixel for individual color components as R, G, and B (step S1602).

If the value obtained by subtracting the brightness G from the read brightness R is more than 30 and the value obtained by subtracting the read brightness B from the read brightness R is more than 30 (YES in step S1603), the shading correction values (the gain correction values and the offset correction values) are adjusted in accordance with a gain adjustment value and an offset adjustment value for red (step S1604). If the value obtained by subtracting the read brightness R from the read brightness G is more than 30 and the value obtained by subtracting the read brightness B from the read brightness G is more than 30 (YES in step S1605), the shading correction values (the gain correction values and the offset correction values) are adjusted in accordance with a gain adjustment value and an offset adjustment value for green (step S1606). If the value obtained by subtracting the read brightness R from the read brightness B is more than 30 and the value obtained by subtracting the read brightness G from the read brightness B is more than 30 (YES in step S1607), the shading correction values (the gain correction values and the offset correction values) are adjusted in accordance with a gain adjustment value and an offset adjustment value for blue (step S1608).

If all the determinations of steps S1603, S1605, and S1607 are negative, the shading correction values (the gain correction values and the offset correction values) are adjusted in accordance with a gain adjustment value and an offset adjustment value for gray (step S1609). The gain adjustment values and the offset adjustment values for red, green, blue, and gray are set in advance in the processing of step S1508 of FIG. 15.

On the basis of the adjusted shading correction values, shading correction processing for read data of the target pixel is performed, and image data on which shading correction has been performed is output to the image forming device (step S1610). If it is determined in step S1611 that the target pixel is not located at the end (completion of reading of the original), a pixel that is located one pixel next to the target pixel is set as the next target pixel (step S1612). Then, the process returns to step S1602. If it is determined in step S1611 that the target pixel is located at the end, the process is terminated.

Figure 17:
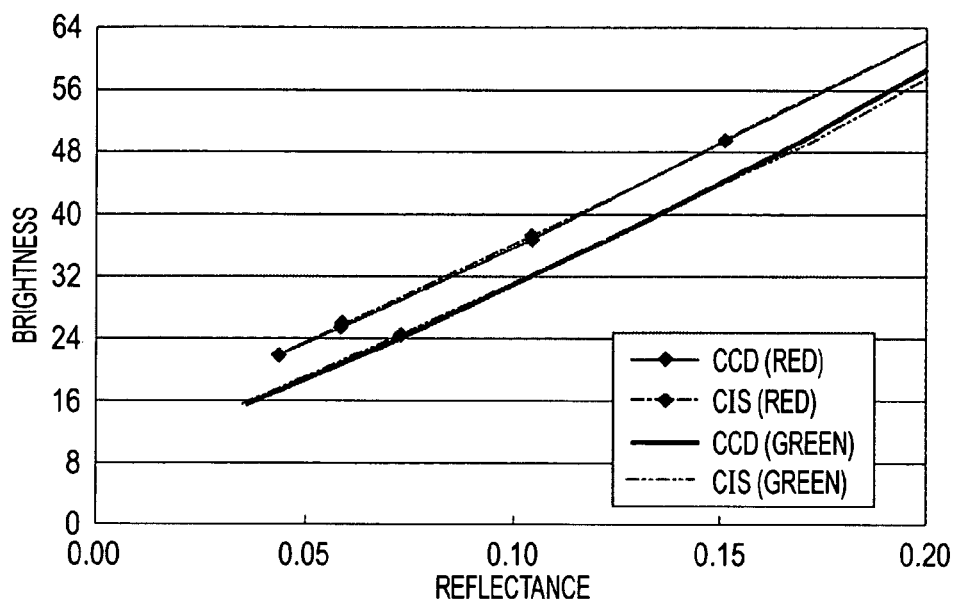
FIG. 17 is a graph showing read brightnesses of the front and back sides of blue patches after adjustment for the front and back sides using the blue patches of the color chart is performed.

FIG. 17 is a graph showing a state after differences in the linearity characteristic of the front side for a blue tone portion and the linearity characteristic of the back side for a blue tone portion are reduced by the above-described process performed by the image processor 203. Accordingly, for example, in the case that an original image contains a blue portion, correction processing for reducing differences in the linearity characteristic of the front side and the linearity characteristic of the back side when the blue image is read can be performed. Thus, differences in the linearity characteristic of the front side and the linearity characteristic of the back side can be reduced for each pixel in accordance with the hue of the original image.

An adjustment value is changed on the basis of a value "30" as a reference in each of steps S1603, S1605, and S1607 in this embodiment. However, the value "30" is merely an example, and a different value may be used in accordance with a characteristic of the device. In addition, the color chart includes patches of reference colors, red, green, and blue, as well as gray patches, in this embodiment. However, the color chart may include patches of reference colors, cyan, magenta, and yellow, as well as gray patches, as long as the color chart includes patches of a plurality of colors. In addition, patches of a color for which a user wants to perform strict color management may be added to the color chart. Thus, the color chart may include patches of any color. In addition, although any one of four adjustment values is selected in this embodiment, any one of three or less adjustment values (adjustment colors) or five or more adjustment values (adjustment colors) may be selected.

Although a case where the CCD 126 (the reduction optical system) is used for front-side reading and the CIS 128 (the equal-magnification optical system) is used for back-side reading has been described in this embodiment, the CIS 128 may be used for front-side reading and the CCD 126 may be used for back-side reading. In addition, an aspect of the present invention can also be applied to a case where image sensors of the same type are used as the front-side reading unit and the back-side reading unit.

Furthermore, an image sensor to be used for image reading is not necessarily limited to the CCD 126 or the CIS 128. The image sensor may be, for example, a complementary metal-oxide semiconductor (CMOS) image sensor.

In addition, the color chart 1100 shown in FIG. 11 includes gray, red, green, and blue patches arranged in the main-scanning direction. Instead, a color chart in which a plurality of patches of the same color and same density are arranged in the main-scanning direction and different color patches are arranged in the sub-scanning direction may be read for the above-described processing. Thereby, a difference in reading characteristic in the main-scanning direction can be reduced.

Figure 18:
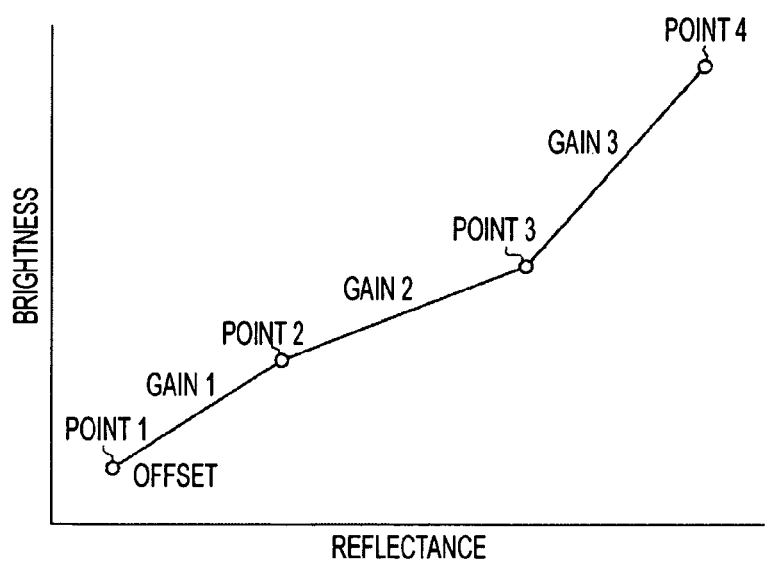
FIG. 18 is a graph showing an example in which linearity characteristic is calculated on the basis of three or more patches.

In addition, in the foregoing embodiment, the linearity characteristic is obtained on the basis of two patches, a low-density patch and a high-density patch. However, the linearity characteristic may be obtained on the basis of three or more patches. For example, as shown in FIG. 18, the linearity characteristic for three sections (gains 1 to 3) may be obtained on the basis of read brightnesses of patches having reflectances corresponding to points 1 to 4. In addition, since even based on patches having the same density, different reading characteristics are obtained depending on the state of an original surface (surface nature of an original), that is, the reading characteristic obtained when an original surface is glossy is different from the reading characteristic obtained when an original surface is not glossy, the linearity characteristic may be adjusted in accordance with the state of an original surface. In this case, in accordance with the type of an original, adjustment values for the front and back sides for a glossy original, an original for offset printing, an original for electrophotography, or a matte original are set in advance, as in the foregoing embodiment. Then, when the original is read, the user operates the operation unit to input the type of the original to select appropriate adjustment values. Accordingly, adjustment for the front and back sides suitable for the type of an original can be achieved.

Although the linearity characteristic of the back-side reading unit is adjusted so as to match the linearity characteristic of the front-side reading unit in the above-described embodiment, the linearity characteristic of the front-side reading unit may be adjusted so as to match the linearity characteristic of the back-side reading unit. Alternatively, both the linearity characteristic of the front-side reading unit and the back-side reading unit may be adjusted such that the linearity characteristic of the front-side reading unit matches the linearity characteristic of the back-side reading unit. Accordingly, the relative relationship of the tone characteristic between the front-side reading unit and the back-side reading unit when a color chart are read can be corrected.

In addition, although the image reading device performs adjustment for the front and back sides in the above-described embodiment, such adjustment for the front and back sides may be performed by a personal computer or an image forming device connected to the image reading device. In this case, the image forming device or the personal computer is provided with functions equivalent to those of the image processors 203 and 213. The image forming device or the personal computer receives image data of a chart read by the image reading device, and performs processing relating to the above-described calculation and adjustment on the basis of the image data. A program for executing such processing is stored in a storage medium, such as a hard disk or a compact disc read-only memory (CD-ROM). The program is read and executed by a CPU of the image forming device or the personal computer.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-172744 filed Jun. 29, 2007, which is hereby incorporated by reference herein in its entirety.

What is claimed is:

1. An image reading device comprising:
a first reading unit configured to read a first side of an original;
a second reading unit configured to read a second side of the original; and
a correction unit configured to select one of correction values corresponding to hues based on a hue of an image read by the second reading unit and correct, for individual color components, a relative relationship between slopes and intercepts of a tone characteristic of the first reading unit and slopes and intercepts of a tone characteristic of the second reading unit based on the selected correction value.

2. The image reading device according to claim 1, wherein the correction unit corrects the relative relationship between the tone characteristic of the first reading unit and the tone characteristic of the second reading unit based on the correction value corresponding to the hue, the correction value being set based on image data of a color reference original read by the first reading unit and the second reading unit.

3. The image reading device according to claim 2, wherein the color reference original includes images of a plurality of colors, and the correction unit performs correction based on correction values corresponding to the plurality of colors.

4. The image reading device according to claim 3, wherein the color reference original includes color patches of a plurality of colors, and the correction unit performs correction based on the correction values corresponding to the plurality of colors.

5. The image reading device according to claim 1, wherein the correction unit performs, for individual pixels, correction for the image read by the first reading unit or the second reading unit.

6. The image reading device according to claim 1, wherein the correction unit corrects the tone characteristic of the second reading unit based on the hue of the image read by the second reading unit.

7. The image reading device according to claim 1, wherein the correction unit adjusts the slopes and the intercepts of the tone characteristic of the second reading unit so as to match the slopes and the intercepts of the tone characteristic of the first reading unit.

8. The image reading device according to claim 1, wherein the correction unit corrects, for individual color components, gains and offsets of the tone characteristic of the second reading unit.

9. The image reading device according to claim 1, wherein each of the tone characteristic of the first reading unit and the tone characteristic of the second reading unit is an input-output characteristic.

10. The image reading device according to claim 1, wherein the correction unit corrects a correction value for shading correction to be performed for the image of the original.

11. The image reading device according to claim 1, wherein the correction unit performs correction based on a surface nature of the original.

12. The image reading device according to claim 1, wherein the first reading unit includes a reduction optical system, and the second reading unit includes an equal-magnification optical system.

13. A reading-characteristic correction method for an image reading device including a first reading unit and a second reading unit, the method comprising:
reading, by the first reading unit, a first side of an original;
reading, by the second reading unit, a second side of the original;
selecting one of correction values corresponding to hues based on a hue of an image read by the first reading unit or the second reading unit; and
correcting, for individual color components, a relative relationship between slopes and intercepts of a tone characteristic of the first reading unit and slopes and intercepts of a tone characteristic of the second reading unit based on the selected correction value.

14. An image reading device comprising:
a first reading unit configured to read a first side of an original;
a second reading unit configured to read a second side of the original;
a shading data generation unit configured to generate first shading data for the first reading unit, the first shading data being a gain value and an offset value, based on a value for a first reference member read by the first reading unit and second shading data for the second reading unit, the second shading data being a gain value and an offset value, based on a value for a second reference member read by the second reading unit;
a shading data correction value generation unit configured to generate a plurality of shading data correction values corresponding to a plurality of different colors, based on a value for a color chart including patches of the plurality of different colors read by the first reading unit and a value for the color chart read by the second reading unit;
a first correction unit configured to correct a value for the first side of the original read by the first reading unit based on the first shading data; and
a second correction unit configured to identify a color of a value read for the second side of the original by the second reading unit, to select a shading data correction value from the plurality of shading data correction values based on a result of identification, to correct the second shading data based on the selected shading data correction value, and to correct the value read for the second side of the original based on the corrected second shading data.

* * * * *